United States Patent [19]
Zeppenfeld

[11] Patent Number: 5,113,999
[45] Date of Patent: May 19, 1992

[54] POSITIONABLE DOCTOR BLADE

[75] Inventor: Reiner Zeppenfeld, Allison Park, Pa.

[73] Assignee: Roediger Pittsburgh, Inc., Allison Park, Pa.

[21] Appl. No.: 641,440

[22] Filed: Jan. 14, 1991

[51] Int. Cl.$^5$ ............................................. B65G 45/00
[52] U.S. Cl. .................................. 198/497; 198/499
[58] Field of Search ............... 198/495, 499, 626, 497; 15/256.5

[56]  References Cited
U.S. PATENT DOCUMENTS

| | | | |
|---|---|---|---|
| 4,189,046 | 2/1980 | Ward | 15/256.5 X |
| 4,269,301 | 5/1981 | Gibbs | 198/499 |
| 5,007,523 | 4/1991 | Morefield | 198/497 |
| 5,007,524 | 4/1991 | Morefield | 198/499 |

FOREIGN PATENT DOCUMENTS

WO88/00916  2/1988  PCT Int'l Appl. ................. 198/499

Primary Examiner—Robert P. Olszewski
Assistant Examiner—Cheryl L. Gastineau
Attorney, Agent, or Firm—Ansel M. Schwartz

[57] ABSTRACT

An apparatus for scraping material from a moving surface. The scraping apparatus is comprised of a scraping device disposed at an angle in relationship to the moving surface such that the scraping device scrapes material from the surface of the moving surface without binding the moving surface. Additionally, the scraping device is comprised of a positioning device for selectively positioning the scraping device in contact and out of contact with the moving surface. Additionally, the positioning device comprises device for regulating the force of the scraping device on the moving surface. Preferably, the position device is comprised of a pneumatically or hydraulically operated piston.

9 Claims, 4 Drawing Sheets

POSITIONABLE DOCTOR BLADE

FIELD OF THE INVENTION

The present invention relates to an apparatus for scraping material from a moving surface. More specifically, the present invention relates to a positionable doctor blade for scraping material from a belt which is rotating on a roller.

BACKGROUND OF THE INVENTION

For removing liquid from masses having great liquid content, it is common to subject the masses to a squeezing in a belt press. In such a press, the material is carried between a pair of endless dewatering belts running substantially parallel to each other through a series of rollers. An example of such squeezing apparatuses are disclosed in U.S. Pat. No. 4,543,880, U.S. Pat. No. 4,557,833 and patent application Ser. No. 07/178,716. These devices move the material, on belts, through sets of mutually cooperating rollers, in which high transient line pressures are applied on the masses. After this liquid extraction process is completed, the dewatering belts are separated by a pair of rollers rotating in opposite directions. In this manner, the matter is expelled from between the dewatering belts and thus from the belt press for further processing.

The dewatering belts are wound from the separating rollers back to the beginning of the press where another pair of rollers rotating in opposite direction forces the dewatering belts together thereby pulling in the mass having a high liquid content between the belts. It is a common practice to dispose doctor blades in contact with the separating rollers for scraping off any remaining material and/or liquid before the dewatering belts are circulated back through the machine. However, there is no apparatus in the prior art which describes a positionable doctor blade assembly which can selectively engage and disengage with the moving surface. Further, there is no apparatus in the prior art which describes a doctor blade assembly which can selectively vary the contact force of the blade on the moving surface.

SUMMARY OF THE INVENTION

The present invention pertains to an apparatus for scraping material from a moving surface. The scraping apparatus is comprised of scraping means disposed at an angle in relationship to the moving surface such that the scraping means scrapes material from the surface of the moving surface without binding the moving surface. Additionally, the scraping apparatus is comprised of positioning means for selectively positioning the scraping means in contact and out of contact with the moving surface. Additionally, the positioning means comprises means for regulating the force of the scraping means on the moving surface. Preferably, the position means is comprised of a pneumatically or hydraulically operated piston.

BRIEF DESCRIPTION OF THE DRAWINGS

In the accompanying drawings, the preferred embodiments of the invention and preferred methods of practicing the invention are illustrated in which.

DESCRIPTION OF THE PREFERRED EMBODIMENT

Figure 1:
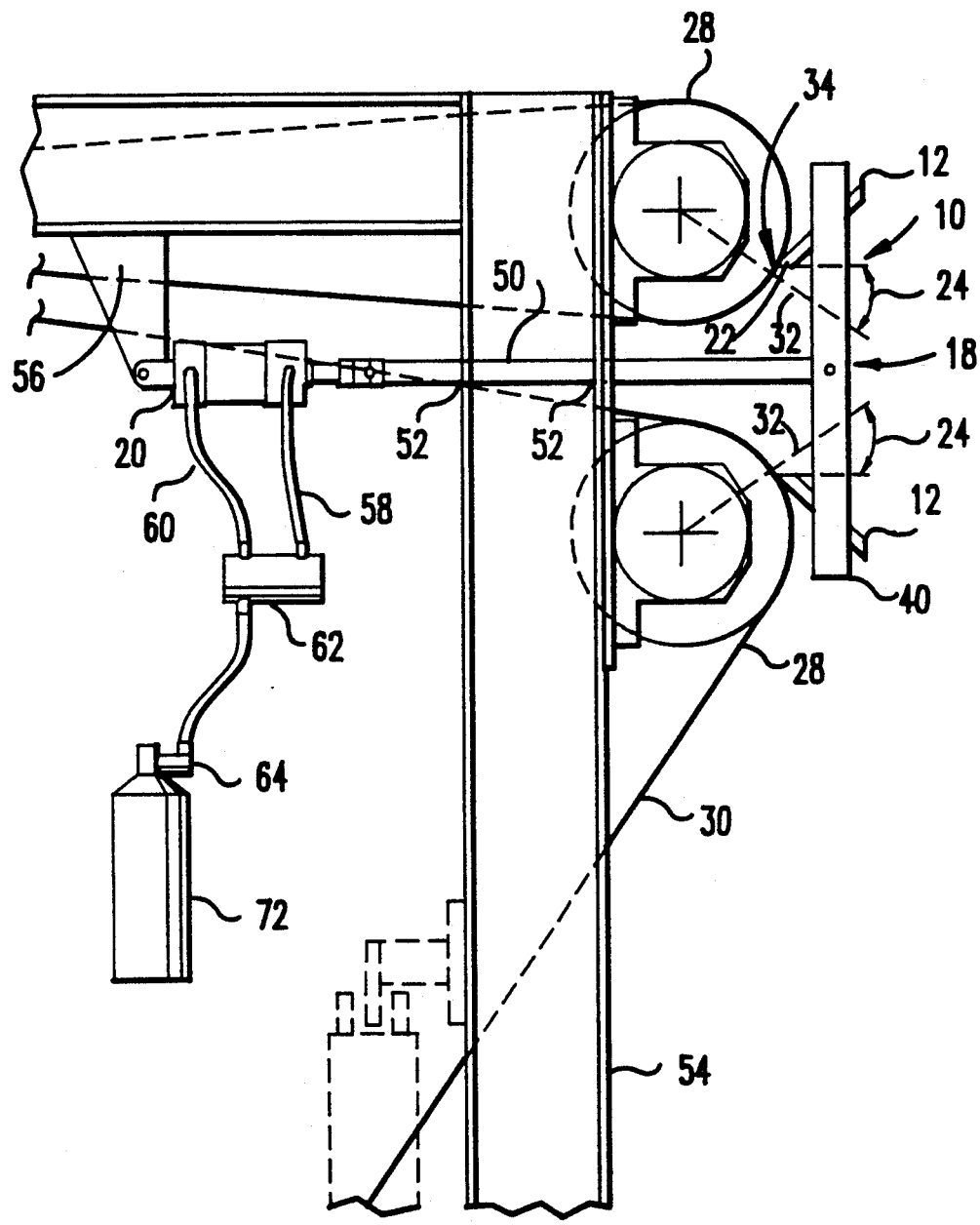
FIG. 1 is a schematic representation of a close-up view of the positionable doctor blade on a belt press.
Figure 2:
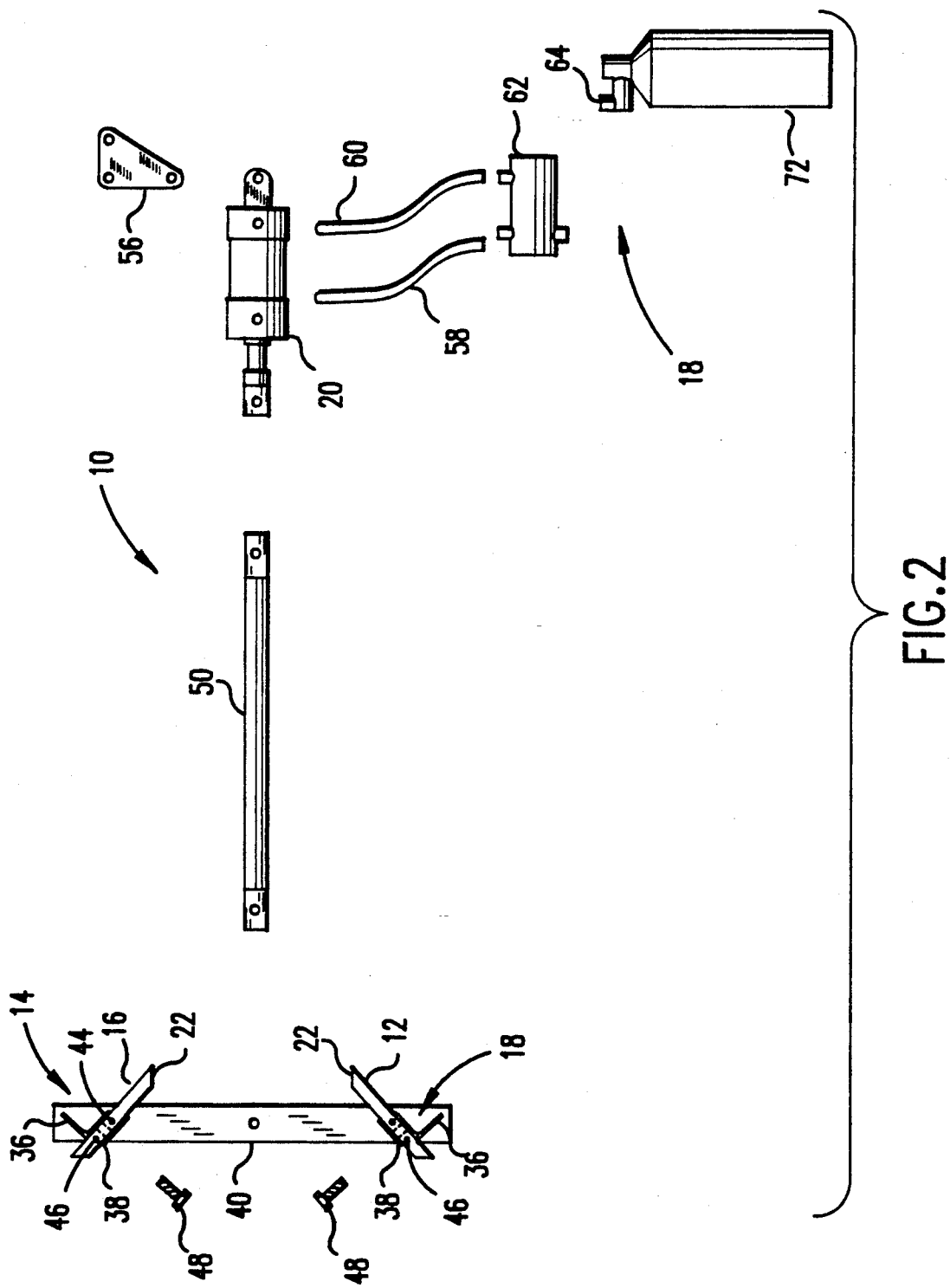
FIG. 2 is a schematic representation of an exploded side view showing the parts of the positionable doctor blade.

Referring now to the drawings wherein like reference numerals refer to similar or identical parts throughout the several views, and more specifically to FIG. 1 thereof, there is shown a scraping apparatus 10 for scraping material from a moving surface 28 comprised of scraping means 12 and positioning means 14.

The scraping means 12 is preferably comprised of two doctor blades 16 which are preferably comprised of a hard plastic having sloped edges 22 at an angle 24 with a perpendicular line 32 drawn from the contact point 34 of doctor blades 16 on moving surface 28 such that the doctor blades 16 provide a sharp surface for scraping material 26 from the surface 26 of dewatering belts 28. It should be noted that the angle 24 should not be so steep as to cause binding of the dewatering belts 30 or to cause excessive wear or dulling of the edges 22. A preferable angle 24 is 45°.

The positioning means 14 are preferably comprised of a bracket assembly 18 for supporting the doctor blades 16. The doctor blades 16 are fixedly attached to the bracket assembly 18 in any convenient manner such that the plane of the doctor blades 16 are essentially perpendicular to the perpendicular line 32, as shown in FIG. 1. This perpendicularity ensures that the frictional force between the dewatering belts 30 and the doctor blades 16 is transmitted to the bracket assembly in a manner which prevents buckling of the doctor blades 16. Preferably, the doctor blades 16 are sandwiched between mounting bars 36 and plates 38. The mounting bars 36 are preferably structural steel sections that are welded to side pieces 40 therein forming a frame serving to support and orient the plane of the doctor blades perpendicular to perpendicular line 32. A plurality of threaded holes 44 are preferably arranged in an evenly spaced linear pattern throughout the length of the mounting bar 36. Similarly, plates 38 and doctor blades 16 are comprised of a plurality of nonthreaded holes 46 in an identical evenly space linear pattern to the threaded holes 44 such that when the mounting bar 36, the doctor blades 16 and the plates 38 are stacked on one another, the threaded holes 44 and the nonthreaded holes 46 are aligned. Threaded fasteners 48 are used to fixedly attach the doctor blades 16 to the mounting bars 36. In this manner, new doctor blades 16 can be installed quickly and easily as the old doctor blades 12 wear out or break.

The positioning means 14 are further comprised of connecting rods 50. Preferably, the connecting rods 50 are pivotably connected to the center of side pieces 40 such that force is directly transmitted between the bracket assembly 18 and the piston 20. Preferably, connecting rods 50 are disposed through guide holes 52 of frame 54 such that the connecting rods 50 can slide through the guide holes 52 as piston 20 selectively engages and disengages the doctor blades 16 from the moving surface 28.

The piston 20 is preferably attached to the machine frame 42 with piston bracket 56. Engaging line 58 and disengaging line 60 are fluidically connected to the piston 20 such that pressurizing engaging line 58 retracts the piston 20 and pressurizing of disengaging line 60 extends the piston 20. The piston can be, for instance, pneumatically or preferably hydraulically operated. Preferably, a three-way valve 62 fluidically connects lines 58 and 60 to a pressure source 72. The three-way valve 62 ensures that only one of lines 58 and 60 are fluidically connected to the pressure source 72 at one time. The positioning means 14 further comprises force regulating means, preferably a pressure regulator 64, for controlling the pressure within the piston 20 such that the piston 20 can exert a predetermined and constant force on the bracket assembly 18 thereby allowing adjustment of the frictional force 35 on moving surface 28.

Figure 4:
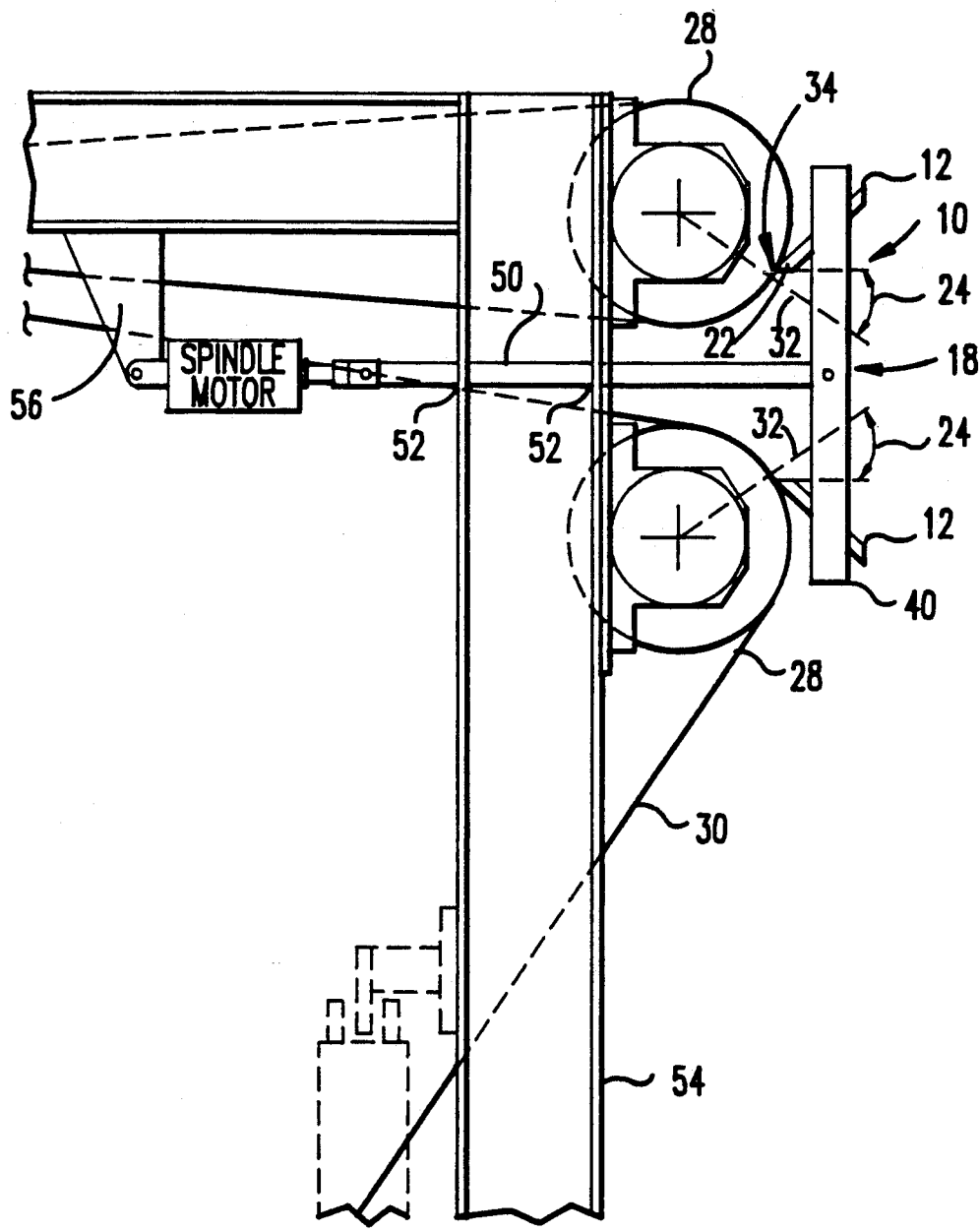
FIG. 4 is a schematic representation of a close-up view of the positional doctor blade on a belt press in an embodiment having a spindle motor.

In a preferred embodiment, and as shown in FIG. 4, the positioning means 14 is comprised of an electric motor, such as a spindle motor, for selectively engaging and disengaging the doctor blades 12 from the moving surface 26. The motor preferably comprises force regulating means for controlling the force of the doctor blades 12 on the moving surface 26.

Figure 3:
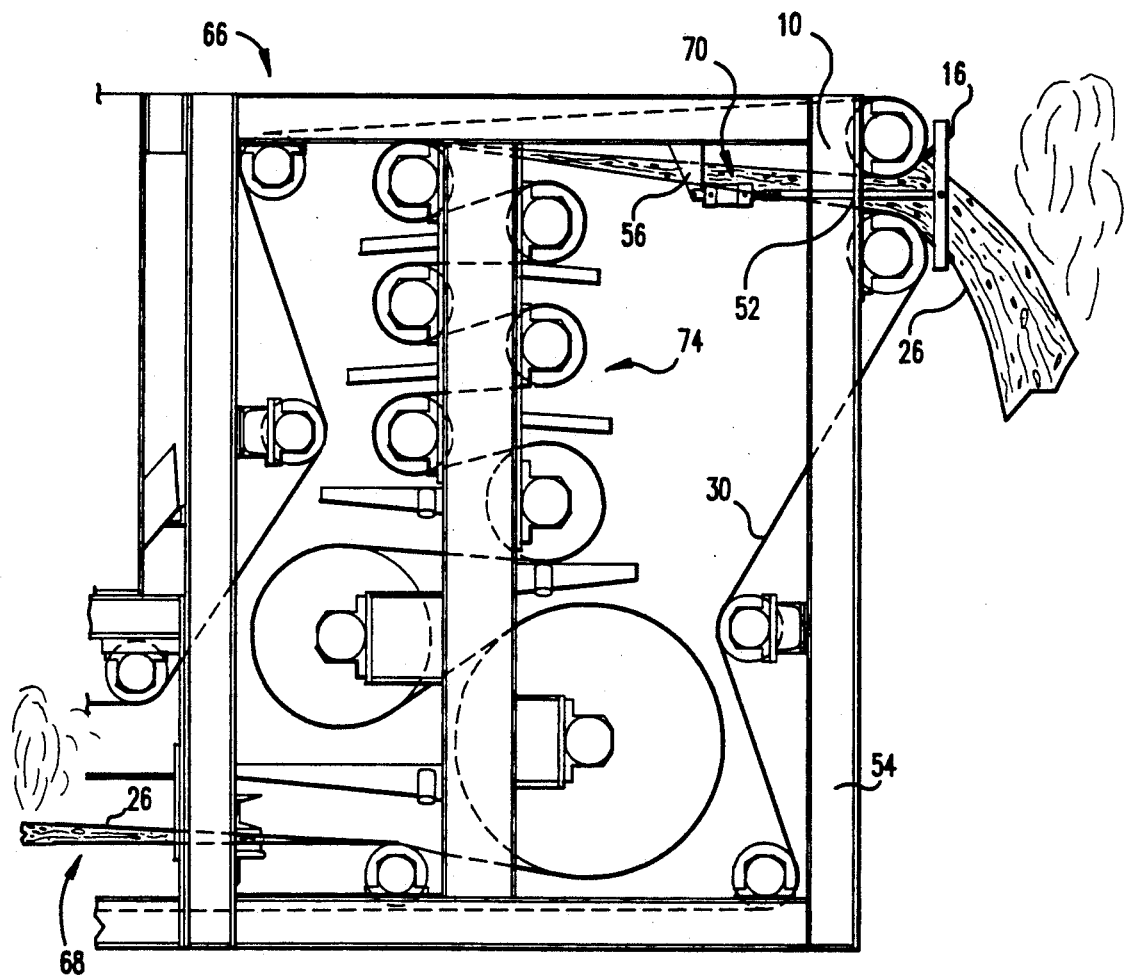
FIG. 3 is a schematic representation showing the positionable doctor blade attached to a belt press.

In the operation of the preferred embodiment and referring to FIG. 3, the scraping apparatus 10 is shown in relationship to a belt press 66. Material 26 is pulled in between the dewatering belts 30 as shown at 68 and squeezed through a series of rollers 74. After this liquid extraction process, the dewatering belts are separated thereby expelling the material 26 as shown at 70. While engaged, the scraping apparatus 10 scrapes any excess material 26 from the surface 28 of dewatering belts 30 in the following manner. The 3-way valve 62 is caused to pressurize the engaging line 50 thereby retracting the piston 20. This retraction pulls the doctor blades 16, which are connected to the bracket assembly 18, onto the moving surface 28 of the dewatering belts 30. Pressure regulator 64 allows the pressure within the piston 20 to be regulated such that the frictional force 35 can be varied.

Disengagement of the scraping apparatus 10 from the surface 28 of dewatering belts 30 is initiated by pressurizing the nonengaging line 60 by the 3-way valve 62. This action extends the piston thereby pushing the doctor blades 16 away from the dewatering belts 30. The guide holes 52 serve to guide the connecting rod 50 as it extends and retracts. After disengagement, the doctor blades 12 can be readily cleaned or replaced for future operation.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. An apparatus for scraping material from a pair of moving surfaces comprising:
   a pair of scraping means disposed at an angle in relationship to the moving surfaces such that each of said scraping means scrapes material from its respective moving surface without binding the moving surface;
   a bracket assembly to which the pair of scraping means are fixedly attached;
   positioning means pivotally connected to the bracket assembly for selectively positioning the pair of scraping means in contact and out of contact with the moving surfaces;
   wherein the position means moves the bracket assembly in a linear path to position the pair of scraping means in contact with the moving surfaces; and
   wherein contact of the pair of scraping means against the moving surfaces essentially balances the bracket assembly about the positioning means.

2. An apparatus as described in claim 1 wherein the positioning means includes means for regulating the force of the scraping means on the moving surface.

3. An apparatus as described in claim 2 wherein the positioning means includes a piston.

4. An apparatus as described in claim 3 wherein the piston is pneumatically operated.

5. An apparatus as described in claim 4 wherein the scraping means includes at least one doctor blade.

6. An apparatus as described in claim 2 wherein the positioning means includes an electric motor.

7. An apparatus as described in claim 6 wherein the electric motor includes a spindle motor.

8. An apparatus as described in claim 7 wherein the scraping means includes at least one doctor blade.

9. An apparatus as described in claim 3 wherein the piston is hydraulically activated.

* * * * *

UNITED STATES PATENT AND TRADEMARK OFFICE
CERTIFICATE OF CORRECTION

PATENT NO. : 5,113,999
DATED : May 19, 1992
INVENTOR(S) : Reiner Zeppenfeld

It is certified that error appears in the above-indentified patent and that said Letters Patent is hereby corrected as shown below:

In the abstract, line 10, after "comprises" insert "a".

Column 2, line 24, after "surface", replace "26" with -- 28 -- .

Column 3, line 17, delete "35".

Column 3, line 24, replace "26" with -- 28 -- .

Column 3, line 40, delete "35".

Signed and Sealed this

Fourteenth Day of September, 1993

Attest:

BRUCE LEHMAN

*Attesting Officer*      *Commissioner of Patents and Trademarks*